Patented Mar. 13, 1934

1,950,641

UNITED STATES PATENT OFFICE 1,950,641

RESIN BONDED WHEEL

Frederick A. Upper, Niagara Falls, Ontario, Canada, assignor, by mesne assignments, to Bakelite Corporation, New York, N. Y., a corporation of Delaware No Drawing. Application December 17, 1930, Serial No. 503,105

4 Claims. (Cl. 51—280)

This invention relates to the manufacture of bonded articles and particularly to those bonded articles comprising abrasive granules and a resinous binder.

The objects of the invention are to provide new and improved bonded articles of the type set forth and a method of producing them.

Bonded articles containing abrasive granules and a synthetic resinous binder have been found to be extremely useful in certain grinding operations, since they possess physical characteristics different in many respects from those having ceramic, rubber or cementitious bonds. One of these characteristics is strength.

A strong bond produces an abrasive article that is resistant to wear, or, as it is commonly denoted in the abrasive art, a hard abrasive article. The term "hard" as applied to bonded abrasive articles differs in meaning from that used in connection with the granular abrasive material without bond and should therefore be replaced by the term "toughness", as we have done in this specification, when the bonded article is referred to. The term "hardness" applies in articles that are homogeneous and connotes resistance to being scratched, whereas the term "toughness" indicates the degree of difficulty one encounters in breaking away portions of an article.

The toughness of an abrasive article depends, to some extent, upon the ratio of granular material to binder used in the manufacture of the article; thus, an article with a relatively high bond content is tougher than one with a relatively low bond content, other factors being the same in each case. While the range of toughness it is possible to secure by alteration of the bond content is wide in synthetic bonded abrasives, it has been found desirable to produce articles less tough than it is feasible to do by reducing the bond content, and to secure different degrees of toughness without altering the total bond content.

When the bond content is reduced to a point below a certain value the bonding action becomes erratic and is controllable only with extreme difficulty, if it is controllable at all. A small amount of bond tends to produce articles that contain portions that are tougher than other portions because the bond cannot be thoroughly distributed through the granular material and spotty wheels are highly undesirable. The lower the bond content the greater the tendency toward uneven distribution of bond; moreover, the mechanical strength of the resulting article drops rapidly with decrease in bond below a certain minimum.

I have found that the desired degree of toughness may be secured without unduly sacrificing strength by replacing part of the irreversible resin bond by a thermally reversible resinous material. One such thermally reversible resin is shellac which, when used as the binding material in abrasive articles, produces articles of substantially the same degree of hardness as such irreversible resins as phenolic condensation resins; for example, an article comprising abrasive grains of approximately 220 mesh and a given amount of shellac bond will be of substantially the same degree of toughness as one comprising 220 mesh abrasive grain and the same amount of phenolic condensation resin bond; however, the same amount of a bond comprising both phenolic condensation resin and shellac will be of lesser toughness.

Shellac is probably the best known of the thermally reversible resins, but my invention is not limited to that particular material. Coumarone resins, which result from the distillation of coal-tar, also are useful for the purpose set forth. These coumarone resins are obtainable with melting points ranging from 50° C. to 160° C. but, in general, we prefer to use those of the higher melting points.

Among other materials that are useful for the purpose set forth are meta-styrene, cellulose acetate, etc. The former, meta-styrene, is a resinous polymer of phenyl-ethylene. It is a hard, glassy resin that becomes plastic when heated to approximately 350° F.

Cellulose acetate alone produces a tough, fibrous bond. It is plastic at temperatures between 275° F. and 400° F.

My method of making bonded articles may be illustrated by the following example.

A mixture of abrasive grains such as silicon carbide, crystalline alumina or garnet with a binding material composed of phenolic condensation resin and shellac, and a solvent or plasticizer such as furfural, is made. While I prefer to make the mixture by first wetting the grain with the solvent or plasticizer and then mixing in the dry resins, I do not wish to limit my invention to this sequence of steps because good results also are obtained when the solvent or plasticizer is added to the dry mixture of grain and resins.

In making a mixture as noted above, I use the irreversible and reversible resins in amounts corresponding to the toughness I desire to produce in the bonded article: for example, if I desire to produce a grade only slightly less tough than is feasible with the irreversible resin only as a bond, I mix with that irreversible resin, such as phenolic condensation resin, the reversible resin, such as shellac in the ratio of fifteen (15) parts by weight of reversible resin to eighty-five (85) parts by weight of irreversible resin. If, on the other hand, I desire to produce a greater softening action I combine the resins in the ratio of sixty (60) parts by weight of irreversible resin to forty (40) parts by weight of reversible resin. I produce other degrees of hardness by using ratios between those given above or by using ratios outside of the range of the ratios stated above.

Having made the desired mixture of grain and bond, I shape the article therefrom by any of the well known methods that are adaptable to the mix produced. The usual method of shaping the article comprises placing the mix in a metal mold and either tamping or pressing it into a compacted article. If the mixture is plastic or can be made plastic, for example by heating, it may be compacted by passage between revolving rolls.

The articles made from the mixture are cured by baking. While the time and temperature of baking cannot be stated definitely for all of the possible variations in bond materials and mixtures thereof, I have found that satisfactory articles result from the typical mixtures given above when the articles are held at a temperature of approximately three hundred and fifty degrees Fahrenheit (350° F.) for approximately seven (7) hours or longer.

Having thus described my invention, what I claim is:

1. Abrasive article comprising abrasive grains and a binder for the abrasive grains, said binder constituting the essential means for uniting the grains to each other and for imparting regulated strength to the article and comprising a resin of thermally irreversible character and a modifier for said resin of thermally reversible character for effecting a change in toughness of the bond regulated by the ratio of the thermally reversible modifier to the thermally irreversible resin without a change in the total binder content necessary to even distribution of the binder throughout the article and to control of the bonding action.

2. Abrasive article comprising abrasive grains and a binder for the abrasive grains, said binder constituting the essential means for uniting the grains to each other and for imparting regulated strength to the article and comprising in major proportion a resin of thermally irreversible character and a modifier in minor proportion for said resin of thermally reversible character for effecting a change in toughness of the bond regulated by the ratio of the thermally reversible modifier to the thermally irreversible resin without a change in the total binder content necessary to even distribution of the binder throughout the article and to control of the bonding action.

3. Article according to claim 1 in which the thermally reversible modifier for the resin is shellac.

4. Method of manufacturing an abrasive article from abrasive grains and a binder therefor constituting the essential means for uniting the grains to each other and imparting regulated strength to the article which comprises preparing the binder from a resin of thermally irreversible character and a modifier for said resin of thermally reversible character, adding said binder in the presence of a wetting agent to the abrasive grains, shaping the article from the resulting mixture by pressure, and baking the article.

FREDERICK A. UPPER.